(12) United States Patent  (10) Patent No.: US 8,375,401 B2
Yasui  (45) Date of Patent: Feb. 12, 2013

(54) INFORMATION PROCESSING DEVICE WITH DEVICE DRIVER FOR DISPLAYING A USER GUIDE

(75) Inventor: Ryo Yasui, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 551 days.

(21) Appl. No.: 12/610,751

(22) Filed: Nov. 2, 2009

(65) Prior Publication Data

US 2010/0115536 A1  May 6, 2010

(30) Foreign Application Priority Data

Oct. 31, 2008  (JP) ................................ 2008-282063

(51) Int. Cl.
  *G06F 3/00* (2006.01)
  *G06F 9/44* (2006.01)
  *G06F 9/46* (2006.01)
  *G06F 13/00* (2006.01)
(52) U.S. Cl. ...................... 719/321; 719/327; 715/700
(58) Field of Classification Search .................. None
  See application file for complete search history.

(56) References Cited

U.S. PATENT DOCUMENTS

| 6,791,709 | B1 * | 9/2004 | Nakamura et al. | 358/1.18 |
| 6,892,359 | B1 * | 5/2005 | Nason et al. | 715/788 |
| 7,979,534 | B2 * | 7/2011 | Nuggehalli | 709/224 |
| 2001/0053295 | A1 * | 12/2001 | Kujirai et al. | 399/79 |
| 2002/0040352 | A1 * | 4/2002 | McCormick | 705/80 |
| 2003/0184799 | A1 * | 10/2003 | Ferlitsch | 358/1.15 |

FOREIGN PATENT DOCUMENTS

| JP | 2001-202223 | 7/2001 |
| JP | 2003-18618 | 1/2003 |
| JP | 2003-084954 | 3/2003 |
| JP | 2003-150356 | 5/2003 |
| JP | 2003-150548 | 5/2003 |
| JP | 2003-152567 | 5/2003 |
| JP | 2005-038011 | 2/2005 |
| JP | 2006-119975 | 5/2006 |

OTHER PUBLICATIONS

Customer Support, Physics & Astronomy—Installing Printers for Windows XP, May 28, 2008, physics.byu.edu, pp. 1-5.*
Japanese Office Action with English translation dated Aug. 10, 2010.

* cited by examiner

*Primary Examiner* — Andy Ho
*Assistant Examiner* — Craig Dorais
(74) *Attorney, Agent, or Firm* — Scully, Scott, Murphy & Presser, PC

(57) ABSTRACT

An information processing device communicable with an external device has a device driver installed therein to control the external device, an application installed therein, and a controller executing the device driver and the application in parallel. The device driver, when executed, causes the controller to acquire from the external device a status code corresponding to a status of the external device, show on a display device a display representing the status of the external device, based on the status code, determine whether the application is executable, execute the application when determining that the application is executable, and transmit the acquired status code to the application in execution. The application, when executed, causes the controller to receive the status code from the transmitter, and show on the display device guidance information containing more detailed information than the display based on the status code.

9 Claims, 13 Drawing Sheets

INFORMATION PROCESSING DEVICE WITH DEVICE DRIVER FOR DISPLAYING A USER GUIDE

CROSS-REFERENCE TO RELATED APPLICATION

This application claims priority under 35 U.S.C. §119 from Japanese Patent Application No. 2008-282063 filed on Oct. 31, 2008. The entire subject matter of the application is incorporated herein by reference.

BACKGROUND

1. Technical Field

The following description relates to one or more information processing devices each of which has a device driver installed therein to control an external device.

2. Related Art

So far, an information processing device such as a personal computer (hereinafter referred to as a PC) has been known, which has software, referred to as a device driver, installed therein to take control of an external device connected with the information processing device. Additionally, among device drivers of this kind, there is a device driver that has a user interface referred to as a status monitor.

The status monitor is configured to monitor the status of the external device and display an error icon or an error message on a display device of the information processing device when an error occurs on the side of the external device.

As an example of the device driver having such a status monitor function, a printer driver has been known which includes a status monitoring portion and an error message database. When a status code is transmitted by a printer to a PC to inform about what kind of error has occurred, the printer driver refers to the error message database and displays an error message corresponding to the status code.

SUMMARY

In the meantime, firmware installed in the external device may be upgraded for various reasons such as an improved function or an additional function. At that time, a new status code may be added along with the upgrading of the firmware.

In this case, when a device driver having an internal error message database, such as the aforementioned printer driver, is used without being updated, it is impossible to display an error message corresponding to the newly added status code. Therefore, in order to solve such a problem, a device driver conforming to the upgraded firmware has to be installed such that the device driver on the side of the information processing device is consistent with the firmware on the side of the device.

Aspects of the present invention are advantageous to provide one or more improved information processing devices each of which makes it possible to, even after firmware installed in an external device is updated, inform a user about the status of the external device without having to update a device driver installed in the information processing device to control the external device, and to reduce the amount of information to be contained in the device driver.

According to aspects of the present invention, an information processing device configured to communicate with an external device is provided. The information processing device includes a device driver installed in the information processing device to control the external device, an application installed in the information processing device, and a controller configured to execute the device driver and the application in parallel. The device driver is configured to, when executed, cause the controller to serve as an acquiring unit configured to acquire from the external device a status code corresponding to a status of the external device, a status display unit configured to show on a display device a display representing the status of the external device, based on the status code acquired by the acquiring unit, a determining unit configured to determine whether the application is executable, an executing unit configured to execute the application when the determining unit determines that the application is executable, and a transmitter configured to, in response to the executing unit executing the application, transmit the acquired status code to the application in execution. The application is configured to, when executed, cause the controller to serve as a receiver configured to receive the status code from the transmitter, and an information display unit configured to show on the display device guidance information that contains more detailed information than the display shown by the status display unit, based on the status code received by the receiver.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, embodiments according to aspects of the present invention will be described with reference to the accompany drawings.

(1) First Embodiment
<Overall Configuration of System>

Figure 1:
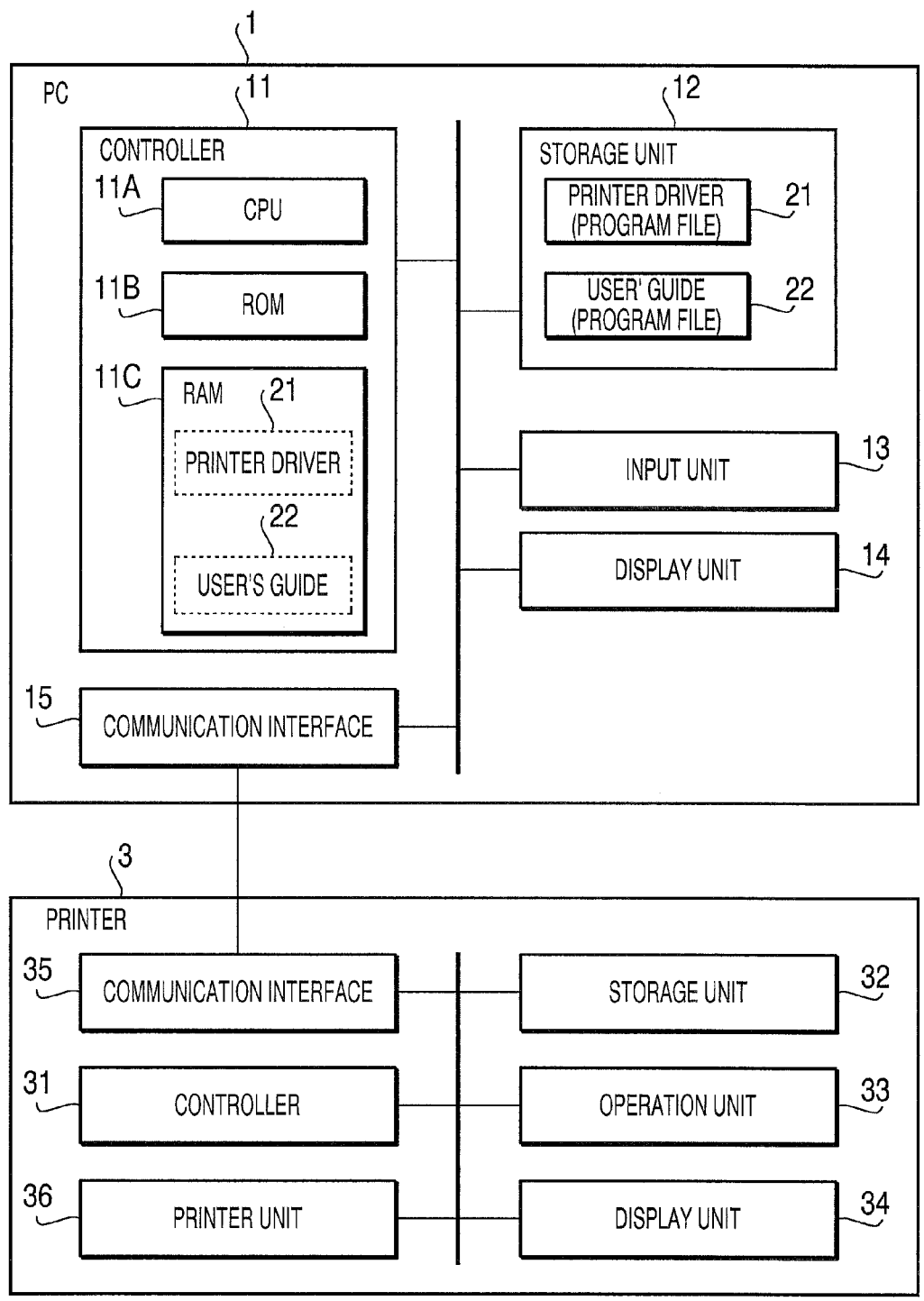
FIG. 1 is a block diagram schematically showing an overall configuration of a system that includes a personal computer and a printer in a first embodiment according to one or more aspects of the present invention.

As illustrated in FIG. 1, a personal computer 1 (hereinafter referred to as a PC 1) includes a controller 11, a storage unit 12, an input unit 13, a display unit 14, and a communication interface 15. The controller 11 is provided with hardware such as a CPU 11A, a ROM 11B, and a RAM 11C. The controller 11 is configured to take various kinds of control by loading into the RAM 11C software such as an operating system (OS) and an application stored on the storage unit 12 and causing the CPU 11A to perform processes in accordance with the software.

The aforementioned software, which functions in the controller 11, includes a printer driver 21 and a user's guide.

The printer driver 21 (more strictly, the CPU 11A executing a process based on the printer driver 21, hereinafter, which is simply referred to as the printer driver 21) has, as well as a function to control the printer 3, a function of a status monitor to acquire a status code from a printer 3 and inform a user about the status of the printer 3 by displaying the status on the display unit 14. In addition, the printer driver 21 has a function to launch the user's guide 22 and a function to transmit the status code acquired from the printer 3 to the user's guide 22 through communication between processes.

The user's guide 22 (more strictly, the CPU 11A executing a process based on the user's guide 22, hereinafter, which is simply referred to as the user's guide 22) is an application program run by the printer driver 21, as mentioned before. The user's guide has a function of displaying guidance information based on a status code when the status code is transmitted by the printer driver 21.

The guidance information displayed by the user's guide 22 is more concrete and detailed information than the status displayed by the printer driver 21. For example, the guidance information includes a way to manage an error and a procedure to replace a consumable supply displayed with a description, an illustration, and/or a moving image.

The storage unit 12 is provided separately from the RAM 11C of the controller 11, and configured with a hard magnetic disk drive (HDD) or a non-volatile memory that has a larger storage capacity. The storage unit 12 is used for storing relatively large volumes of data or data that should be saved when an electrical power supply is blocked. In the first embodiment, as described above, the storage unit 12 stores the printer driver 21 to be loaded into the RAM 11C, program files of the user's guide 22, and program files related to the OS.

The input unit 13 is configured with a known input device, such as a pointing device and a keyboard, which is provided to an information processing device such as the PC 1. The display unit 14 is configured with a known display device, such as a liquid crystal display (LCD) device, which is provided to an information processing device such as the PC 1.

The communication interface 15 constitutes an information transmission channel linking to the printer 3. For instance, the communication interface 15 is configured with a Universal Serial Bus (USB) interface. Nevertheless, the communication interface 15 does not necessarily conform to the USB standard as far as communication can be attained based on the same communication standard as that of the printer 3. As an alternative interface other than the USB interface, a parallel interface or a Local Area Network (LAN) interface may be applied.

The printer 3 includes a controller 31, a storage unit 32, an operation unit 33, a display unit 34, a communication interface 35, and a printer unit 36. The controller 31 takes control of each unit of the printer 3. Further, when detecting any of various statuses such as "cover opened," "out of paper," "paper jam," "toner (ink) shortage," and "time for replacement of one of consumable supplies," the controller 31 transmits a status code corresponding to the detected status to the PC 1.

The storage unit 32 is configured with a non-volatile memory, on which firmware for controlling hardware included in the printer 3 is stored. Further, the controller 31 takes control based on the firmware. In addition, the aforementioned status codes are stored on the storage unit 32. Then, when one of the aforementioned various statuses is detected by the controller 31, a status code that corresponds to the detected status is read out of the storage unit 32 and utilized.

<Overview of Information Transmitted from Printer to Process on PC>

Subsequently, an overview will be given to set forth how (through what channel) information is transmitted from the PC 3 to a process (of the printer driver 21 or the user's guide 22) on the PC 1.

Figure 2:
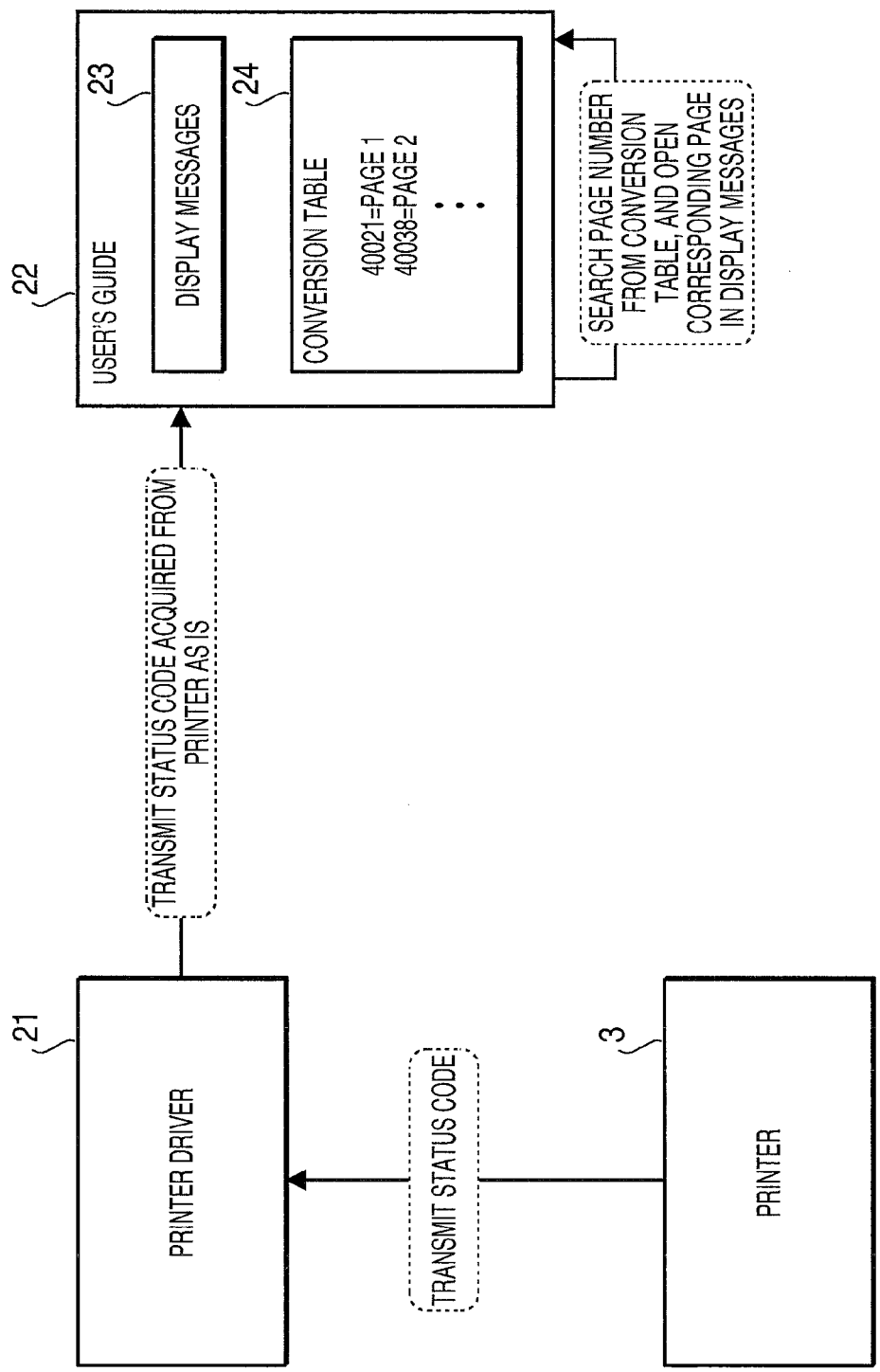
FIG. 2 is a block diagram schematically showing an information transmission channel from the printer to a user's guide via a printer driver in the first embodiment according to one or more aspects of the present invention.

As mentioned above, when detecting any of the various statuses such as "cover opened," "out of paper," "paper jam," "toner (ink) shortage," and "time for replacement of one of consumable supplies," the printer 3 transmits, to the PC 1, a status code corresponding to the detected status (see FIG. 2).

On the PC 1 side, the printer driver 21 receives the status code transmitted by the printer 3. The printer driver 21 has a status monitor function, in which the printer driver 21 display a status using an icon in a simple manner. Nevertheless, in order to display detailed information, the printer driver 21 conveys the status code received from the printer 3, as it is, to the user's guide 22.

The user's guide 22 is provided with display messages 23 and a conversion table 24. The driver's guide 22 searches, from the conversion table 24, a page number (e.g., "Page 1," and "Page 2" exemplified in FIG. 2) in the display massages 23, with the status code transmitted by the printer driver 21 (e.g., "40021," and "40038" exemplified in FIG. 2) as a search key.

Then, the user's guide 22 opens (displays on the display unit 14) a page identified by the page number found through the searching, so as to display guidance information (e.g., a way to manage the status "cover opened" and a procedure to supply papers) corresponding to the status code.

Figure 3:
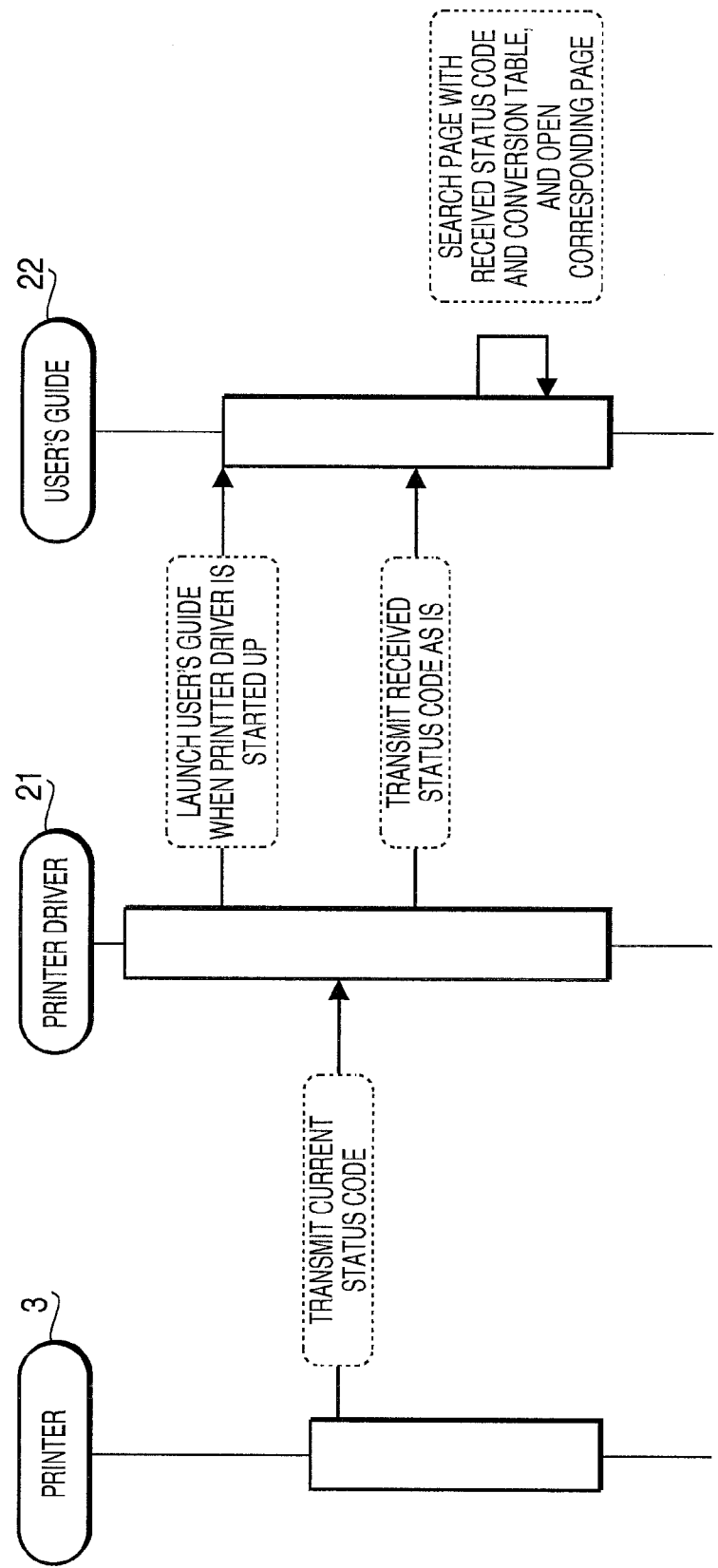
FIG. 3 is a timing chart schematically showing start-up timings and information transmission timings of the printer, the printer driver, and the user's guide in the first embodiment according to one or more aspects of the present invention.

As shown in FIG. 3, the printer driver 21 is launched when the PC 1 is booted or the printer driver 21 is called by an application for executing a printing operation. After that, the printer driver 21 waits in a standby state as a resident process in the PC 1. Further, when the printer driver 21 is launched, the printer driver 21, as a parent process, launches the user's guide 22 as a child process. Thereafter, the user's guide 22 waits in a standby state as a resident process in the PC 1.

In this state, after the printer 3 is powered on and transmits a status code representing a current status to the printer driver 21, the printer driver 21 sends the received status code as is to the user's guide 22, while showing a simple status display by itself, as mentioned above.

The user's guide, which has received the status code, searches a corresponding page in the display messages 23 with the received status code as a search key and the conversion table 24, and opens the corresponding page to display guidance information on the display unit 14, as described before.

<Detailed Process Executed by Printer Driver>

Subsequently, a detailed explanation will be given about a process to be executed by the printer driver 21 in the PC 1, with reference to FIG. 4. The following process is executed when the PC 1 is booted.

Figure 4:
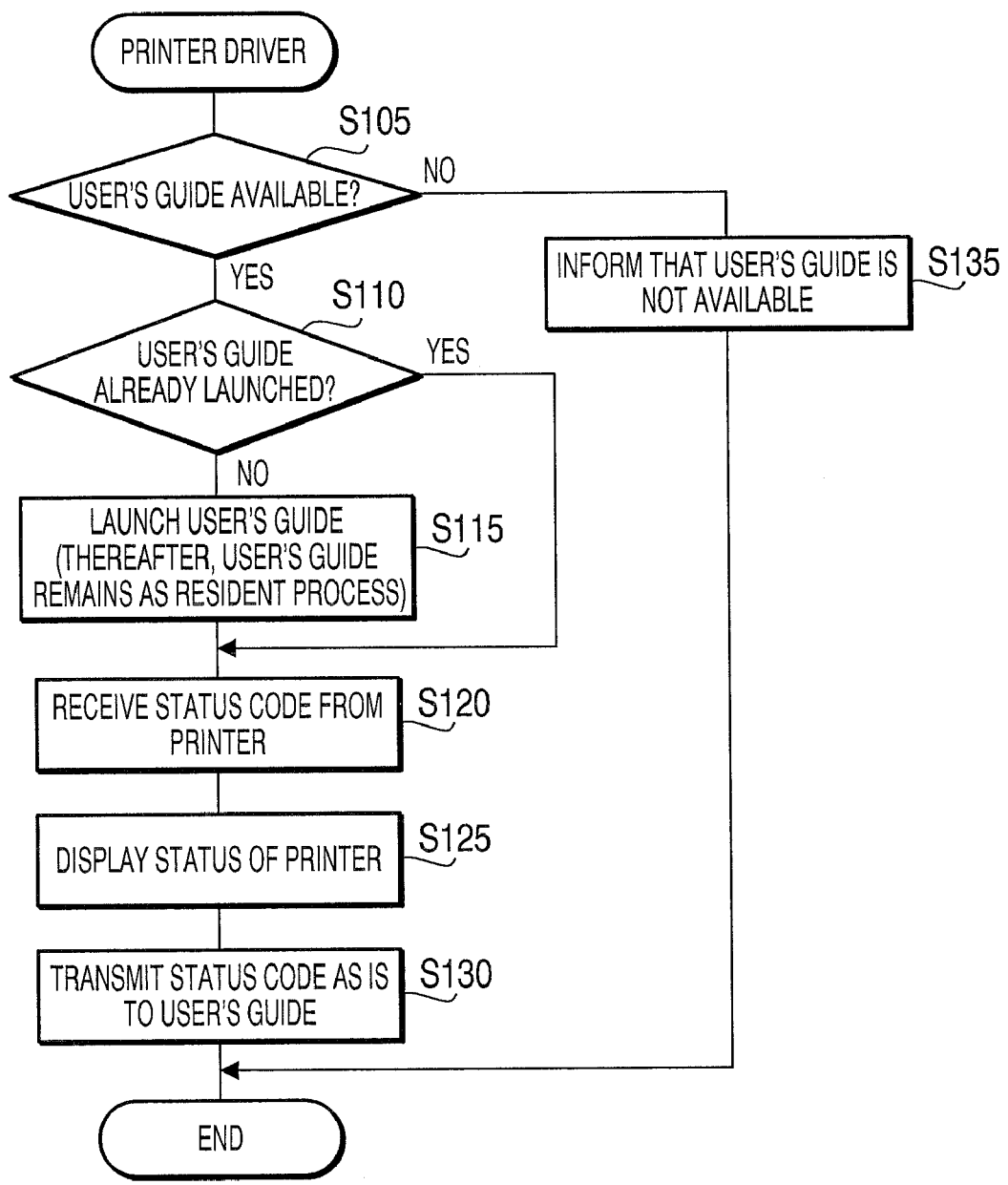
FIG. 4 is a flowchart of a process to be executed by the printer driver in the first embodiment according to one or more aspects of the present invention.

When the process shown in FIG. 4 is started, the printer driver 21 first determines whether the user's guide 22 is available (S105). In general, the user's guide 22 is installed into a particular folder when the printer driver 21 is installed, and information as to where the particular folder is registered in a setting file created at the time of the installation or a registry managed by the OS.

In S105, the printer driver 21 reads a path name of the particular folder from the setting file or the registry, and checks whether there is a file that has a file name corresponding to the user's guide 22 in the folder, so as to determine whether the user's guide 22 is available.

When the user's guide 22 is available (S105: Yes), the printer driver 21 determines whether the user's guide 22 has already been launched (S110). Since, as mentioned before, the user's guide 22 waits ready as a resident process in the PC 1 after being launched, the printer driver 21 makes a negative determination in S110 (i.e., S110: No) only at the first attempt to perform the present process. In this case (S110: No), the printer driver 21 launches the user's guide (S115), and then proceeds to S120. Meanwhile, the printer driver 21 makes an affirmative determination in S110 (i.e., S110: Yes) at the second or later attempt to perform the present process. In this case (S110: Yes), the printer driver 21 goes to S120 without executing S115.

In S120, the printer driver 21 waits for a status code to be transmitted by the printer 3, and when a status code is transmitted, the printer driver 21 receives the status code (S120). Then, based on the status code received, the printer driver 21 displays the status of the printer 3 on the display unit 14 of the PC 1 in a simple manner using an icon (S125).

Thereafter, the printer driver 21 transmits the status code as is to the user's guide 22 (S130), and terminates the present process. In S130, the status code is transmitted by the printer driver 21 to the user's guide 22 through communication between processes. Here, the communication between processes may be attained in an arbitrary method employing a message queue, a pipe, a common memory, or the like.

Meanwhile, when determining that the user's guide 22 is not available (S105: No), the printer driver 21 informs, with a display shown on the display unit 14, that the user's guide 22 is not available (S135). After that, the printer driver 21 terminates the present process shown in FIG. 4.

It is noted that, even after terminating the process shown in FIG. 4, the printer driver 21 remains as a resident process on the PC 1, and executes S120 and the subsequent steps every time the printer driver 21 receives a status code from the printer 3 at regular or odd intervals.

<Detailed Process Executed by User's Guide>

Next, a detailed explanation will be given about a process to be executed by the user's guide 22 in the PC 1 with reference to FIG. 5. The user's guide 22 performs the following process every a single status code received from the printer driver 21, after the printer driver 21 starts up the user's guide 22. The present process is repeatedly performed at regular or odd intervals during a period of time when the printer driver 21 and the user's guide 22 are functioning.

Figure 5:
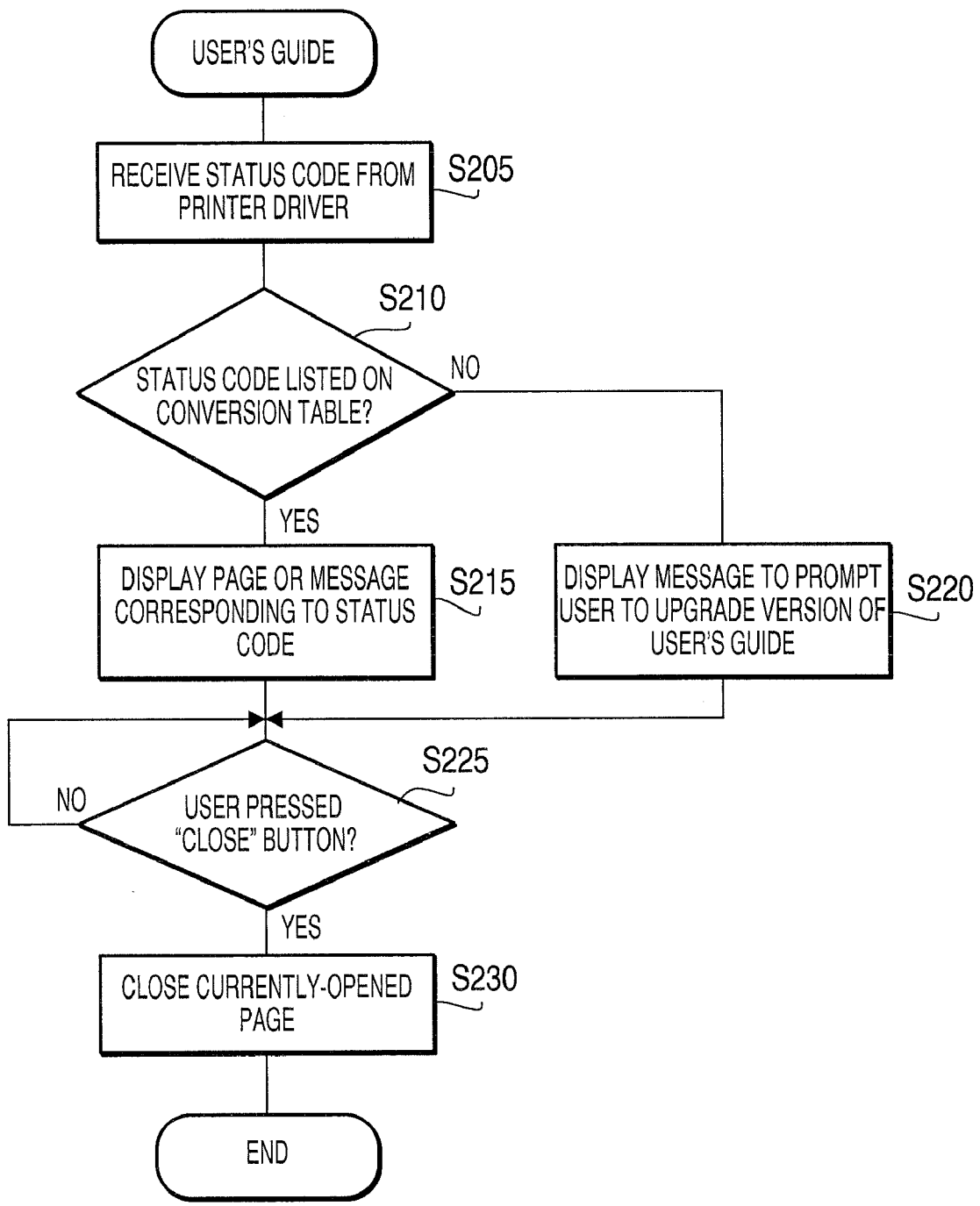
FIG. 5 is a flowchart of a process to be executed by the user's guide in the first embodiment according to one or more aspects of the present invention.

When the process illustrated in FIG. 5 is started, the user's guide 22 receives a status code from the printer driver 21 (S205). Then, the user's guide 22 determines whether the received status code is listed on the conversion table 24 (S210).

In S210, when the received status code is listed on the conversion table 24 (S210: Yes), the user's guide 22 displays a page or a message that corresponds to the status code (S215). In S215, when the guidance information contains a large amount of data, the user's guide 22 newly opens a window, on which the user's guide 22 displays the guidance information. Meanwhile, when the guidance information does not contain such a large amount of data, the user's guide 22 displays the guidance information in a message dialogue box.

Meanwhile, when the received status code is not listed on the conversion table 24 (S210: No), the version of the user's guide 22 may not comply with the version of the firmware incorporated in the printer 3.

In such a case, the user's guide 22 displays on the display unit 14 a message which prompts a user to upgrade the version of the user's guide 22 (S220). When such a message is displayed, a user can consider whether to upgrade the version of the user's guide.

After S215 or S220, the user's guide 22 determines whether the user presses a "Close" button and waits for the "Close" button to be pressed (S225). In this state, when the "Close" button is pressed (S225: Yes), the user's guide 22 closes the currently-opened page (S230). Thereafter, the user's guide 22 terminates the present process shown in FIG. 5.

Effects

According to the aforementioned PC 1 provided with the printer driver 21 and the user's guide 22, the printer driver 21 performs the process that includes a step (S120) of acquiring from the printer 3 a status code which represents the status of the printer 3, a step (S125) of displaying on the display unit 14 information which represents the status of the printer 3 based on the status code acquired in S120, a step (S105) of determining whether the user's guide 22 can be launched, a step (S115) of launching the user's guide 22 when it is determined that the user's guide 22 is executable, a step (S130) of transmitting the status code acquired in S120 to the user's guide 22 after launching the user's guide 22.

Further, the user's guide 22 performs the process that includes a step (S205) of receiving a status code transmitted by the printer driver 21, and a step (S215) of displaying on the display unit 14 guidance information which contains more detailed information than the information displayed in S125 on the basis of the status code received in S205.

Thus, when the PC 1 (more specifically, the CPU 11A) launches the printer driver (a device driver) and the user's guide 22 (an application program) as different processes, and the printer driver 21 transmits a status code to the user's guide 22, the user's guide 22 can display guidance information based on the status code.

Therefore, unlike a printer driver having a function of displaying guidance information incorporated therein, even though a new status code is added along with updating of the firmware on the side of the printer 3, it is possible to display guidance information corresponding to the additional status code only by updating the user's guide 22 without having to update the printer driver 21.

Accordingly, the user does not have to perform such a major-scale operation as updating the printer driver 21 that has already been incorporated as a part of the OS. Further, it is possible to minimize influence exercised on the OS.

Further, in the aforementioned embodiment, prior to receiving the status code from the printer 3 in S120, the user's guide 22 is launched immediately after the printer driver 21 is launched (S115). Therefore, at the moment when the printer driver 21 receives the status code from the printer 3 in S120, the printer driver 21 certainly completes the start-up of the user's guide 22 such that the user's guide 22 promptly performs an initial operation for displaying the guidance information.

(2) Second Embodiment

Next, a second embodiment will be described. Nevertheless, each of the second embodiment and the subsequent embodiments has the same configurations as those of the first embodiment. Therefore, in the following description, explanation will be given mainly about differences between the second embodiment (or one of the subsequent embodiments) and the first embodiment. Configurations, of the second embodiment or one of the subsequent embodiments, which are considered the same as the first embodiment with respect to functional aspects, will be indicated by the same reference characters as employed in the first embodiment, explanations about them will be omitted.

Figure 6:
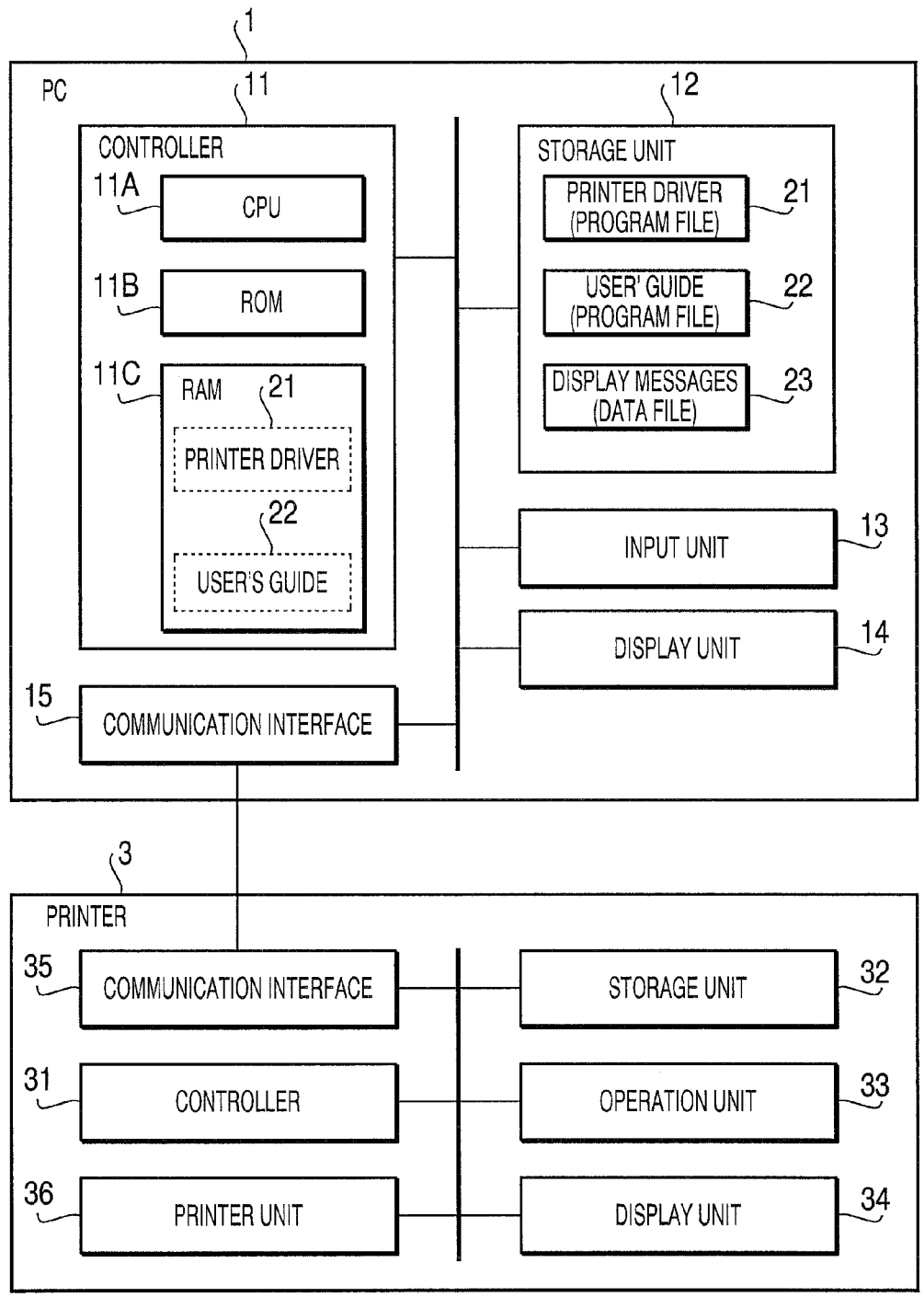
FIG. 6 is a block diagram schematically showing an overall configuration of a system that includes a personal computer and a printer in a second embodiment according to one or more aspects of the present invention.
Figure 7:
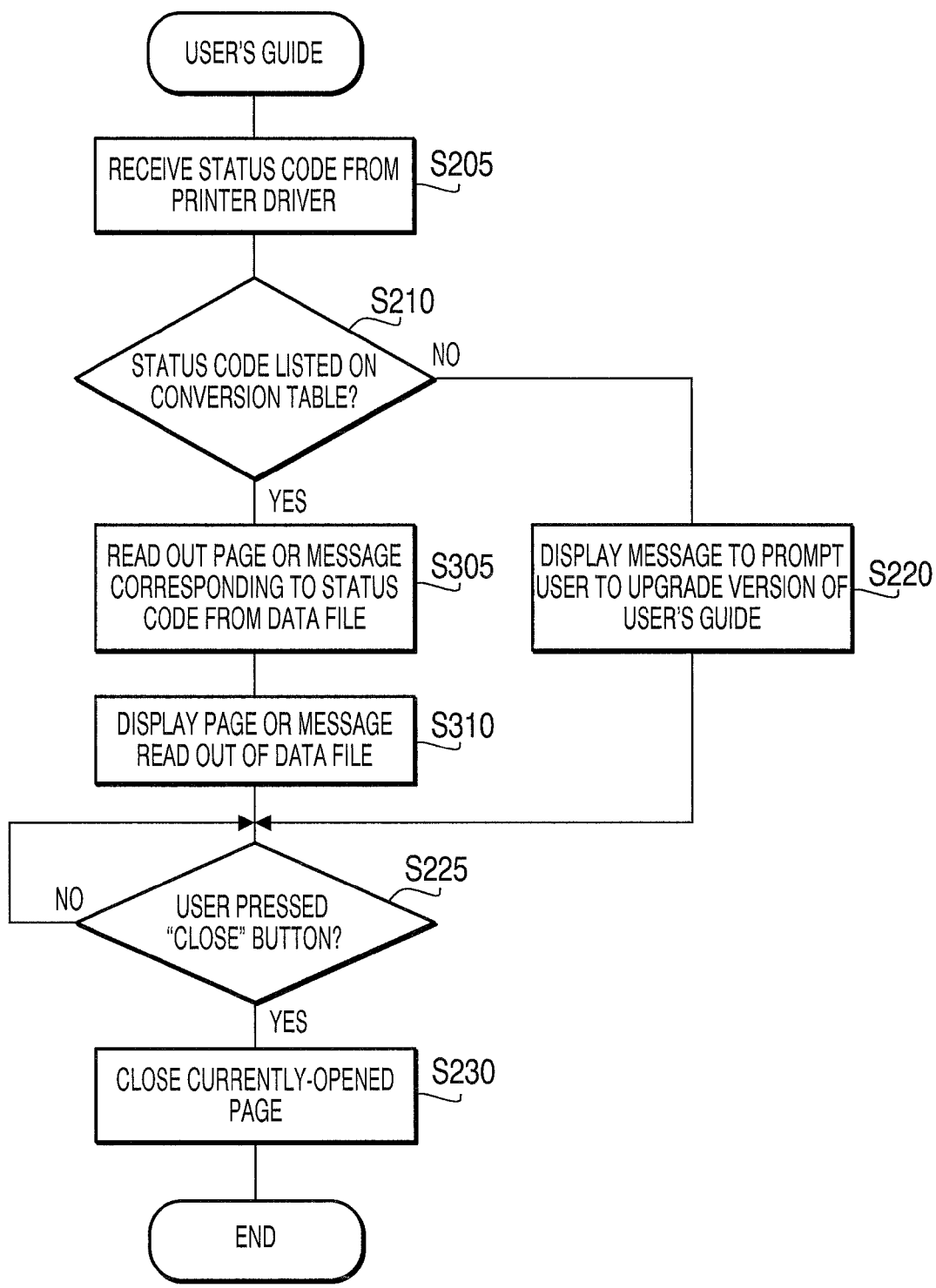
FIG. 7 is a flowchart of a process to be executed by a user's guide in the second embodiment according to one or more aspects of the present invention.

In the aforementioned first embodiment, the user's guide 22 has the internal display messages 23 (see FIG. 2). In the below-mentioned second embodiment, separately from a file in which a program for the user's guide 22 is stored, a file to store the display messages 23 is provided (see FIG. 6). As illustrated in FIG. 7, a process to be executed by the user's guide 22 adopts S305 and S310 instead of S215 in the first embodiment.

Specifically, when the received status code is listed on the conversion table 24 (S210: Yes), the user's guide 22 reads out a page or a message that corresponds to the status code from the file for the display messages 23 (S305). Then, the user's guide 22 displays the page or the message as read out of the data file for the display messages 23 (S310).

Thus, in the situation where the guidance information is stored in the file different from the file in which the program for the user's guide 22 is stored, when wishing to update the guidance information, the user is only required to update the file in which the guidance information is stored, without having to update the file in which the program for the user's guide 22 is stored.

Accordingly, the second embodiment provides the same effects as the first embodiment, and further makes it easier to update the guidance information than the first embodiment.

(3) Third Embodiment

Figure 8:
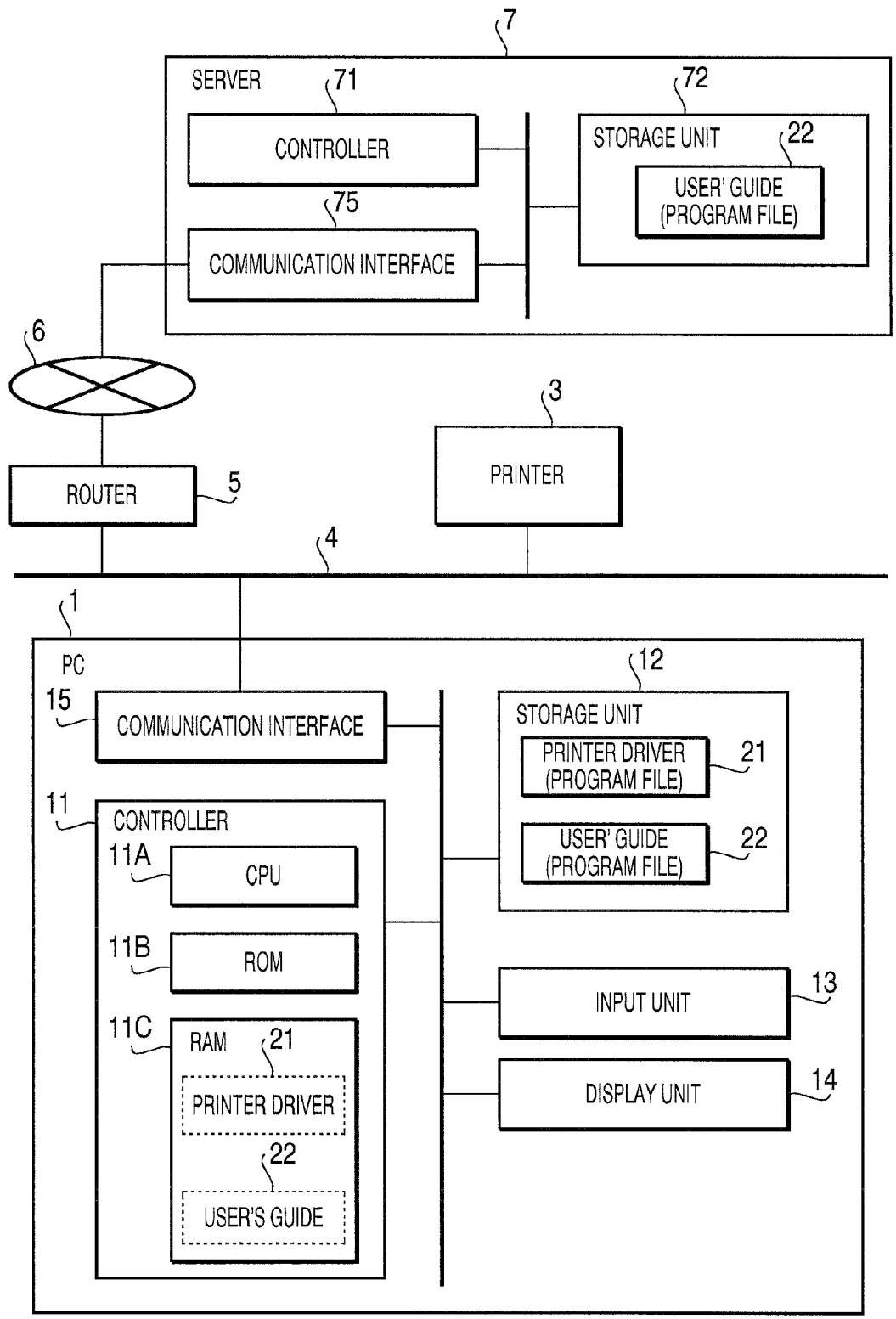
FIG. 8 is a block diagram schematically showing an overall configuration of a system that includes a personal computer, a printer, and a server in a third embodiment according to one or more aspects of the present invention.

Subsequently, a third embodiment will be described. In the third embodiment, as illustrated in FIG. 8, an LAN interface is provided as the communication interface 15, and connected with the printer 3 via an LAN 4. In other words, the printer 3 serves as a network printer, and is utilized by other PCs which are not shown.

The LAN 4 is linked to a WAN 6 (e.g., the Internet) via a router 5. The PC 1 is configured to be communicable with a server 7 through the LAN 4, the router 5, and the WAN 6.

The server 7 includes a controller 71, a storage unit 72, and a communication interface 75. The server 7 has a function to deliver the user's guide 22 stored on the storage unit 72 in response to a download request issued by the PC 1.

Figure 9:
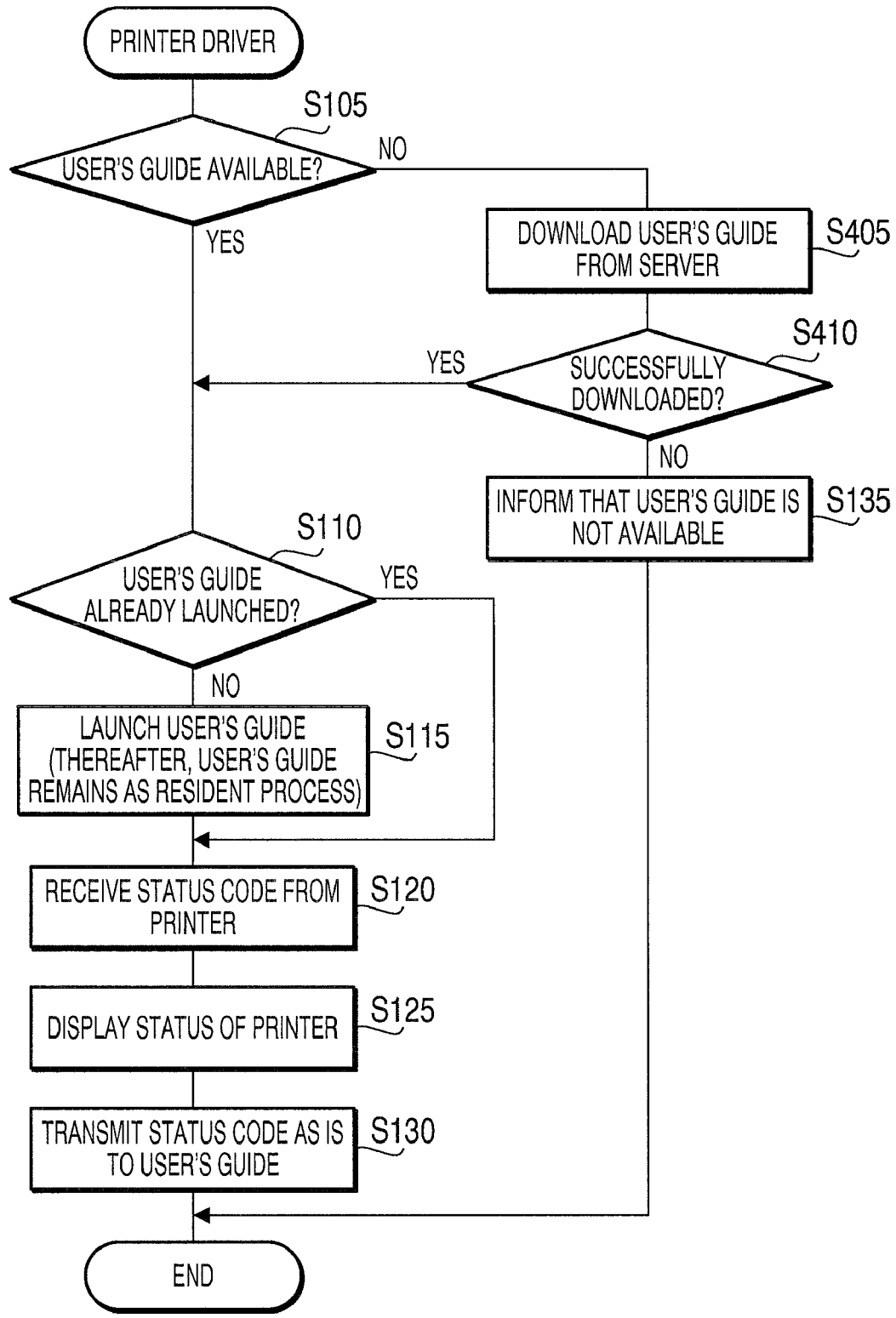
FIG. 9 is a flowchart of a process to be executed by a printer driver in the third embodiment according to one or more aspects of the present invention.

The process to be executed by the printer driver 21 has S405 and S410 added between S105 and S135 in the aforementioned first embodiment, as shown in FIG. 9.

Specifically, when determining that the user's guide 22 is not available (S105: No), the printer driver 21 downloads the user's guide 22 from the server 7 in the third embodiment (S405).

Then, the printer driver 21 determines whether the printer driver 21 has successfully downloaded the user's guide 22 (S410). When determining that the printer driver 21 has successfully downloaded the user's guide 22 (S410: Yes), the printer driver 21 goes to S110 described in the aforementioned first embodiment. Meanwhile, when, for instance, due to an undesirable communication condition, the printer driver 21 has not successfully downloaded the user's guide 22 (S410: No), the printer driver 21 goes to S135 described in the aforementioned first embodiment.

In the first embodiment, when the user's guide 22 is not available, the printer driver 21 goes directly to S135, in which the printer driver 21 informs (shows on the display unit 14) that the user's guide 22 is not available. On the other hand, in the third embodiment, the printer driver 21 attempts to download the user's guide 22. Then, when having successfully downloaded the user's guide 22, the printer driver 21 goes to S110 in the same manner as the printer driver 21 does in the first embodiment when the user's guide 22 is available.

Thus, according to the PC 1 of the third embodiment, the process to be executed by the printer driver 21 includes a step (S405) of downloading the program for activating the user's guide 22 from the server 7 communicable with the PC 1 via the network. In this case, when the step S115 is adapted such that the printer driver 21 launches the user's guide using the downloaded program, even though it is determined that the user's guide cannot be launched, it is possible to activate the user's guide 22 by downloading the program for the user's guide 22.

(4) Fourth Embodiment

Figure 10:
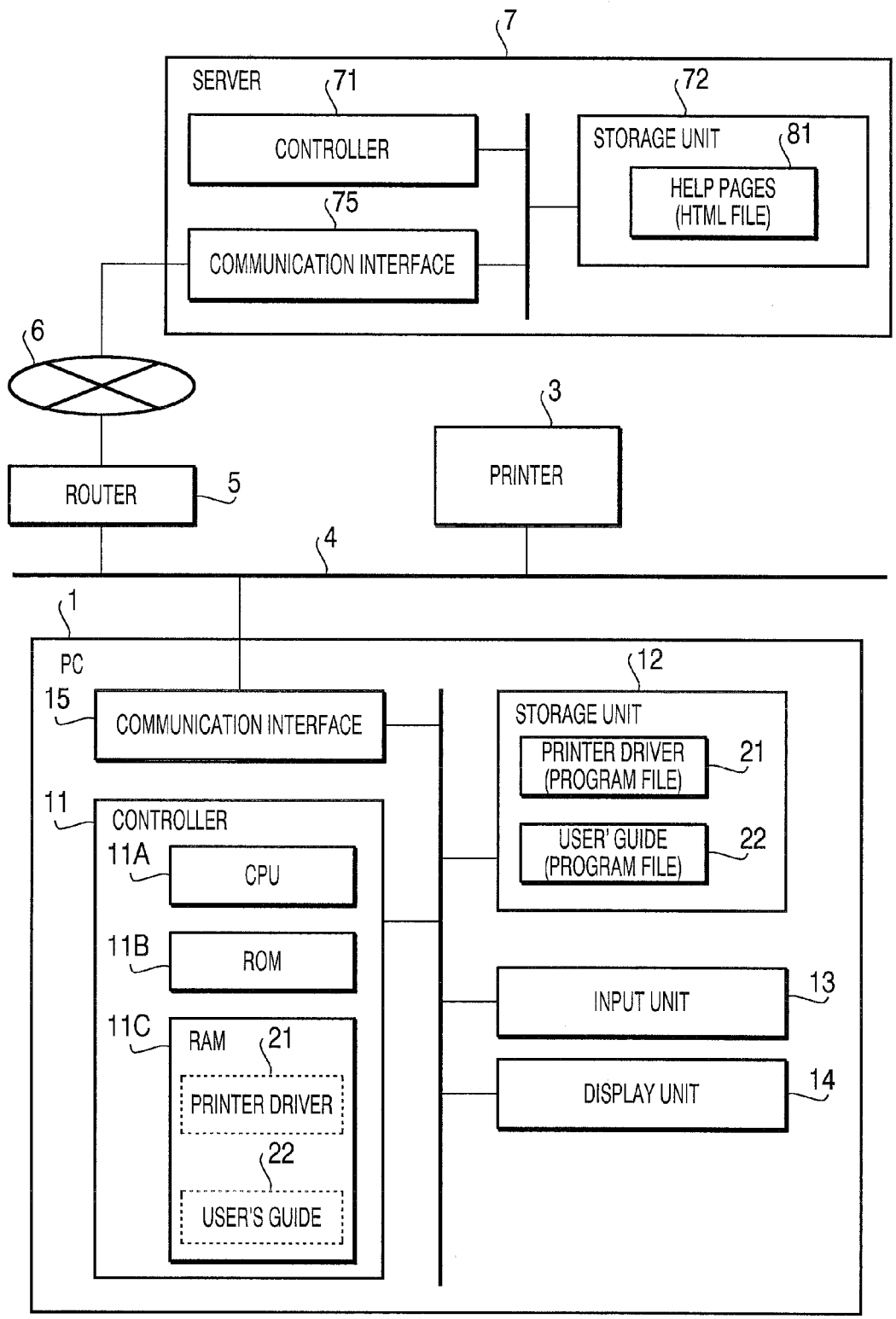
FIG. 10 is a block diagram schematically showing an overall configuration of a system that includes a personal computer, a printer, and a server in a fourth embodiment according to one or more aspects of the present invention.

Subsequently, a fourth embodiment will be described. As illustrated in FIG. 10, a system of the fourth embodiment includes the LAN 4, the router 5, the WAN 6, and the server 7 in the same manner as the third embodiment. However, in this respect, the system of the fourth embodiment is different from that of the third embodiment in that the server 7 has a function to deliver a corresponding one of help pages 81 stored on the storage unit 72 in response to a browse request from the PC 1.

The help pages 81 are an HTML file which can be browsed using a known web browser. The help pages 81 contain information that is the same as or similar to the guidance information displayed by the user's guide 22. However, the help pages 81 are different from the user's guide 22 in that the help pages 81 do not serve as an application program on the PC 1.

Figure 11:
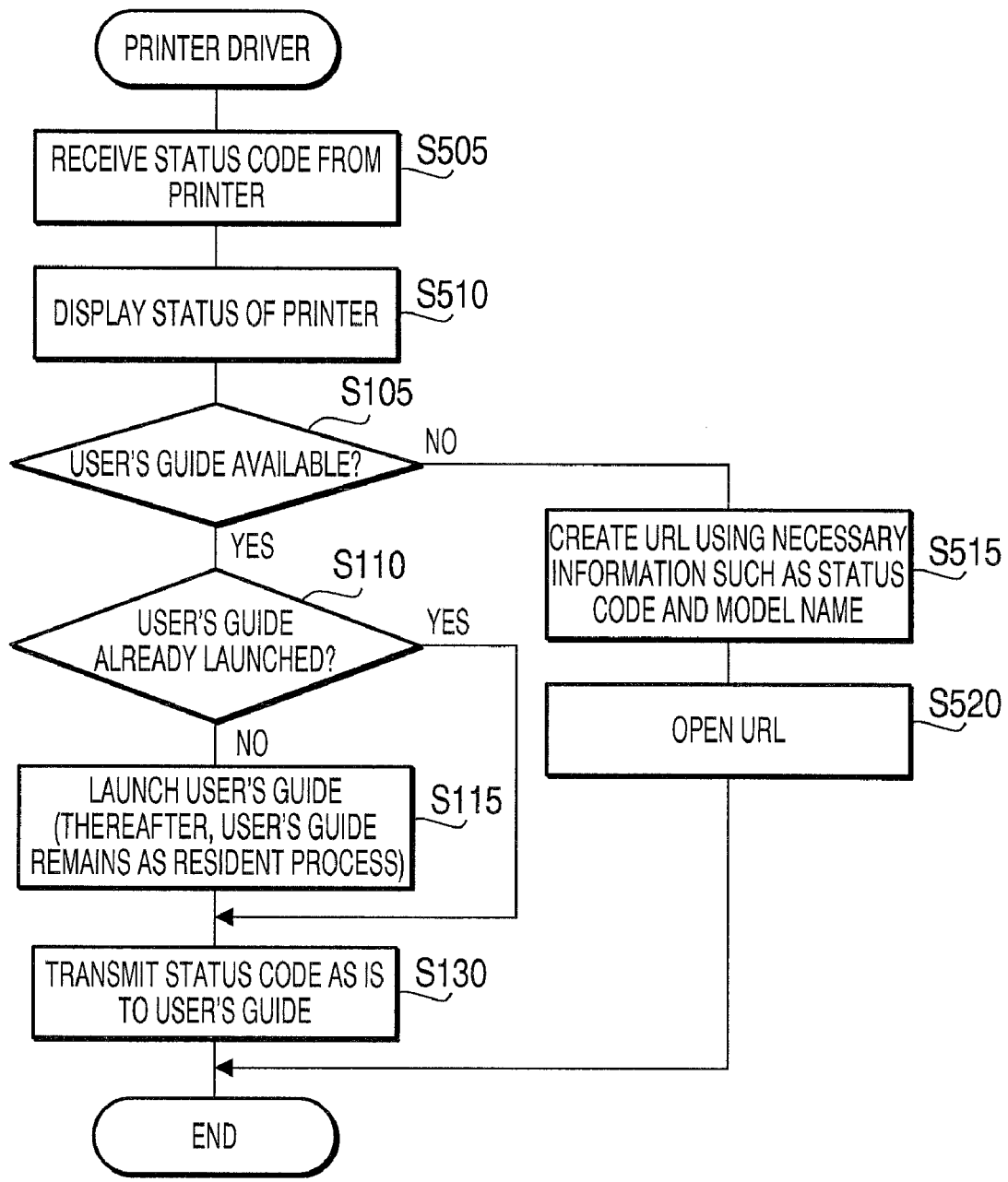
FIG. 11 is a flowchart of a process to be executed by a printer driver in the fourth embodiment according to one or more aspects of the present invention.
Figure 12:
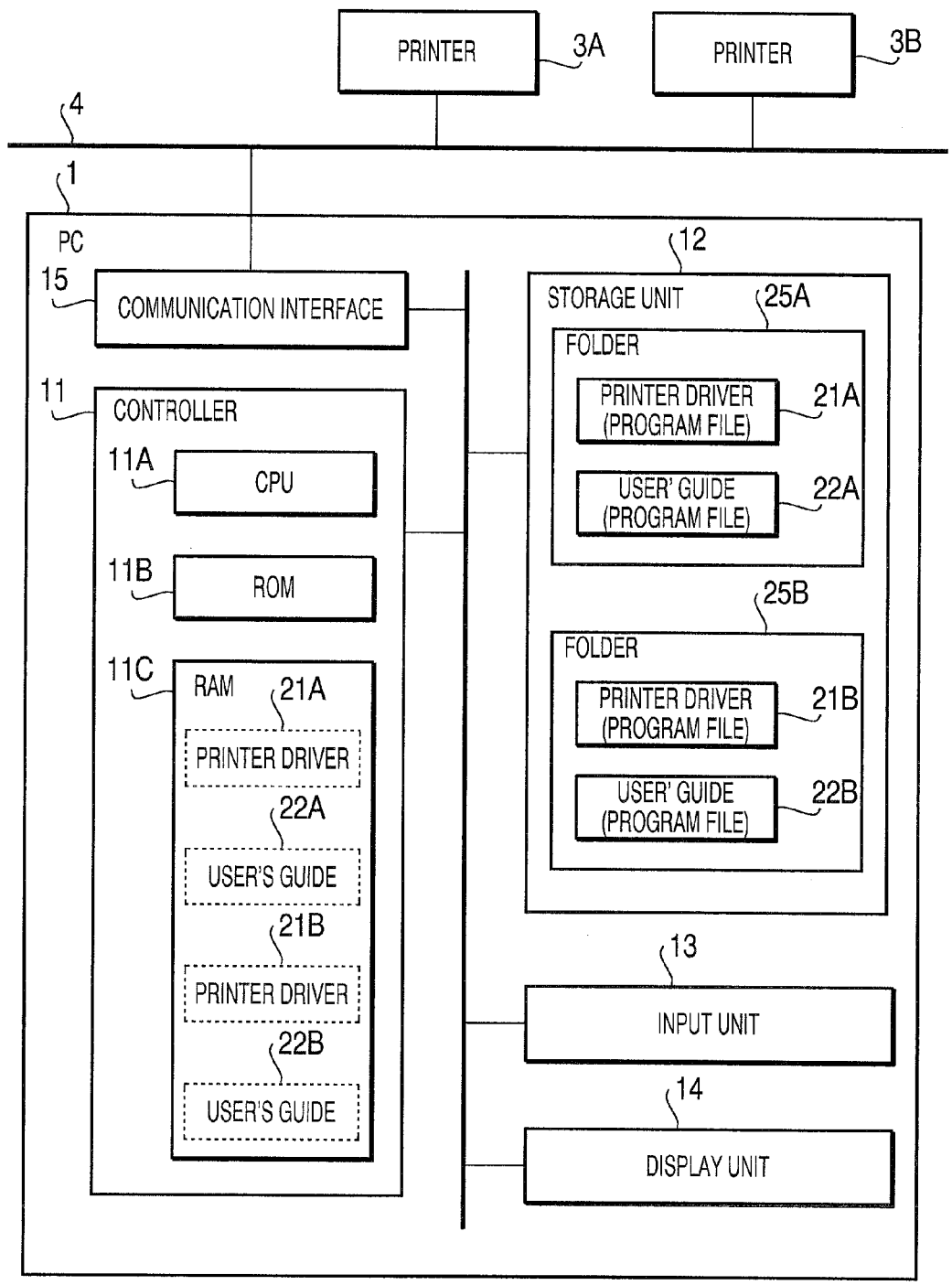
FIG. 12 is a block diagram schematically showing an overall configuration of a system that includes a personal computer, and printers in a fifth embodiment according to one or more aspects of the present invention.

Further, in the fourth embodiment, as shown in FIG. 11, a process to be executed by the printer driver 21 includes additional steps S505 and S510 before S105, whereas excluding S120 and S125 in the aforementioned first embodiment (see FIG. 4).

The steps S505 and S510 substantially correspond to S120 and S125 executed at timings different from those in FIG. 4. Thereby, the printer driver 21 launches the user's guide 22 after acquiring a status code.

Along with employment of the help pages 81, in the fourth embodiment, the steps S515 and S520 are adopted instead of S135 in the first embodiment. Specifically, in the fourth embodiment, when determining in S105 that the user's guide 22 is not available (S105: No), the printer driver 21 creates a URL using necessary information such as a status code and a model name (S515). The URL created here has the necessary information incorporated as one or more parameters Immediately after opening the URL (S520), the printer driver 21 acquires a corresponding one (a web page) of the help pages 81 delivered by the server 7, and displays the page on the display unit 14.

According to the PC 1 configured as above in the fourth embodiment, the PC 1 launches the user's guide 22 after acquiring a status code in S505. Therefore, it is possible to prevent resources of the PC 1 from being wasted before the PC 1 is required to perform operations based on the user's guide 22.

Further, when the user's guide 22 is not available, the PC 1 can display a corresponding one (web page) of the help pages 81 delivered by the server 7. Hence, in the fourth embodiment, it is possible to convey to the user a more appropriate way to manage the printer 3 than the first embodiment in which the PC 1 merely informs that the user's guide is not available.

(5) Fifth Embodiment

Next, a fifth embodiment will be described. The fifth embodiment is different from the first embodiment in that there are a plurality of printers 3A and 3B, and the PC 1 has software installed therein that corresponds to the plurality of printers 3A and 3B. It is noted that a LAN interface is employed as the communication interface 15, and this is a common feature among the third, fourth, and fifth embodiments.

More specifically, in the fifth embodiment, a folder 25A is created in the storage unit 12 of the PC 1, and has a printer driver 21A and a user's guide 22A, which correspond to the printer 3A, stored therein. Further, a folder 25B is, as well, created in the storage unit 12 of the PC 1, and has a printer driver 21B and a user's guide 22B, which correspond to the printer 3B, stored therein.

The printers 3A and 3B are of different models, respectively, but have many portions of common specifications therebetween. Therefore, the user's guides 22A and 22B are adapted to display common guidance information in response to the same status code, except for guidance information specific to the respective models of the printers 3A and 3B.

Figure 13:
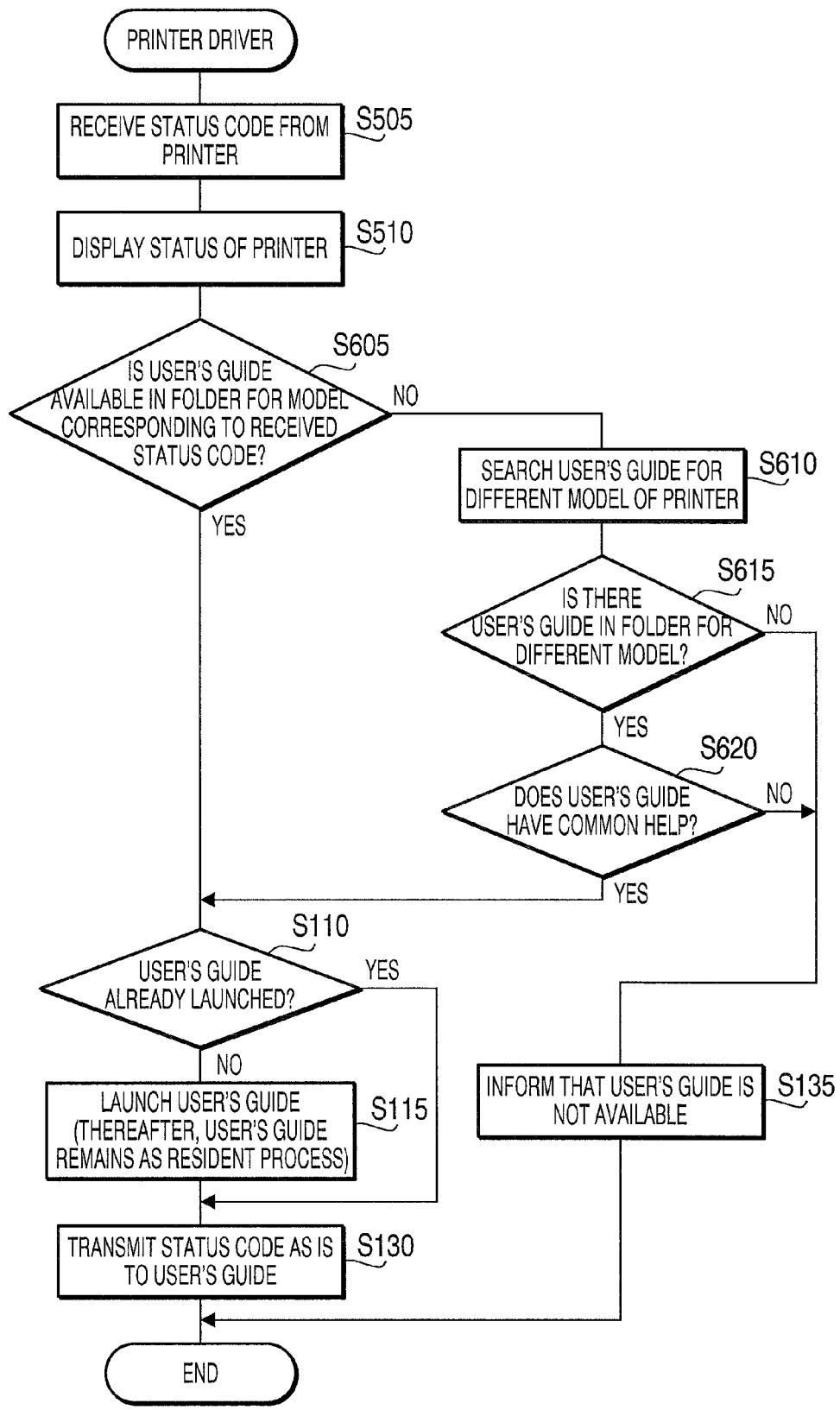
FIG. 13 is a flowchart of a process to be executed by a printer driver in the fifth embodiment according to one or more aspects of the present invention.

Under those assumptions, in the fifth embodiment, a process to be executed by the printer driver 21A includes S605 to S620 as illustrated in FIG. 13, which are adopted instead of S105, S515, and S520 in the aforementioned fourth embodiment.

Specifically, after S510, the printer driver 21A determines whether the user's guide 22A is available in the folder 25A for the model (the printer 3A) corresponding to the status code received in S505 (S605). When the user's guide 22A is available (S605: Yes), the printer driver 21A selects the user's guide 22A to be launched, and goes to S110.

Meanwhile, when the user's guide 22A is not available (S605: No), the printer driver 21A searches a user's guide (in the fifth embodiment, the user's guide 22B) for a different model of printer (in the fifth embodiment, the printer 3B) (S610). In S610, referring to printer information that has already been installed in the PC 1, the printer driver 21A selects a folder in which the printer driver 21A is to determine whether there is a user's guide.

After S610, the printer driver 21A determines whether there is a user's guide in the folder (in the fifth embodiment, the folder 25B) for the different model of printer (S615).

The determination in S615 may be made, for instance, based on whether there is a file of a particular file name. In order to improve the correctness of the determination in S615, when there is a file of the particular file name, the printer driver 21A may read out a header of the file and determine whether the header includes proper information representing that the file is a user's guide.

When determining that there is a user's guide in the folder for the different model of printer (S615: Yes), the printer driver 21A determines whether the user's guide has a common help (between the present user's guide and the user's guide 22A) corresponding to the received status code (S620).

The determination in S620 may be made by reading out a file in which a program for the user's guide is actually stored and verifying the file. However, for example, when the printer driver 21A has a list of information as to what version of user's guide does or does not have a common help corresponding to the status code, the printer driver 21A can determine whether the user's guide has the common help, only by reading out information on the version of the user's guide from the header of the file.

Namely, in the fifth embodiment, through S615 and S620, it is determined whether a subject program meets predetermined requirements.

As a result of the determinations in S615 and S620, for example, when the user's guide 22B is in the folder 25B for the different model of printer (S615: Yes), and the user's guide 22B has the common help (S620: Yes), the subject program is determined to meet the predetermined requirements. In this case, the printer driver 21A selects the user's guide 22B as a program to be launched, and goes to S110.

Meanwhile, when there is not a user's guide in the folder for the different model of printer (S615: No), or the user's guide, in the folder for the different model of printer, does not have the common help (S620: No), the subject program is determined not to meet the predetermined requirements. In this case, the printer driver 21A goes to S135.

It is noted that the determination conditions in S615 and S620 may be replaced with other conditions as far as the other conditions provide correct determination as to whether the subject program is an alternative program for the user's guide 22A.

As mentioned above, in the PC 1 of the fifth embodiment, when determining that it is impossible to launch the user's guide 22A, the printer driver 21A selects, as a program having the same function as the program for activating the user's guide 22A, a program which meets predetermined requirements (e.g., the determination conditions in S615 and S620) among programs installed for printers (e.g., the printer 3B) different from the printer 3A. In this case, the step S115 serves as a step of launching the user's guide 22B, which functions based on the selected program, instead of the user's guide 22A.

Thus, according to the PC 1 configured as above, even though the user's guide 22A cannot be launched for some reason, it is possible to avoid a situation where no guidance information is displayed, by launching the user's guide 22B having a common help between the user's guides 22A and 22B that corresponds to the status code received.

Hereinabove, the embodiments according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

(6) Modifications

In the aforementioned first embodiment, the display messages 23 are incorporated in the user's guide 22. Further, in the aforementioned second embodiment, the display messages 23 are stored in a file different from the user's guide 22. In the same manner, the conversion table 24 shown in the first embodiment may be stored in a file different from the user's guide 22. In this case, the user's guide 22 may load the conversion table 24 stored in the different file, and thereafter make a conversion from a status code into a page number.

In the aforementioned first embodiment, when the user presses the "Close" button (S225: Yes), the user's guide 22 closes the currently-opened page. Alternatively or optionally, the process to be executed by the user's guide 22 may include additional steps of determining whether the error is settled, based on a status code received from the printer 3, and closing the currently-opened page even though the user does not press the "Close" button, when the error is settled. Thereby, it is convenient that the user feels as the currently-opened page is closed automatically without any user's effort to press the "Close" button, when the error is settled.

In the aforementioned third embodiment, the printer driver 21 downloads the program for the user's guide 22 from the server 7 in S405 and S410, and then launches the downloaded user's guide 22 in S110 and S115. However, the determination as to whether to download or launch the program for the user's guide 22 may be made in accordance with a user's choice.

For example, the step S405 may be adapted to open a website (e.g., a webpage delivered by the server 7 having a web server function) on which the user's guide 22 can be downloaded. Further, a step may be added, in which the user's guide 22 is actually downloaded when the user performs an operation to begin the download on the webpage.

Furthermore, separately from the step in which the user makes a selection as to whether to download the user's guide 22, a step may be added in which a dialog box is displayed to prompt the user to make a selection as to whether to launch the user's guide 22 downloaded. In this case, a step may be added in which the printer driver 21 determines whether to launch the user's guide 22, depending on a user operation performed on the dialog box.

In the aforementioned embodiments, a printer is exemplified as a device. However, aspects of the present invention may be applied when a status monitor function to display the status of a device other than the printer is incorporated in an information processing device such as the PC 1. The device other than the printer may be a printing device such as a facsimile machine and a Multi-Function Peripheral (MFP), an image input device such as a scanner, a network camera, and the MFP, an image communication device such as the facsimile machine and the MFP, a communication channel device such as a network router and a network point, or a data storage device such as a network storage.

What is claimed is:

1. An information processing device configured to communicate with an external device, comprising:
   a device driver installed in the information processing device to control the external device;
   a user guide application installed in the information processing device; and
   a controller configured to execute the device driver and the user guide application in parallel,
   wherein the device driver is configured to, when executed, cause the controller to serve as:
      an acquiring unit configured to acquire from the external device a status code corresponding to a status of the external device;
      a status display unit configured to show on a display device a display representing the status of the external device, based on the status code acquired by the acquiring unit;
      a determining unit configured to determine whether the user guide application is executable;
      an executing unit configured to execute the user guide application when the determining unit determines that the user guide application is executable; and
      a transmitter configured to, in response to the executing unit executing the user guide application, transmit the acquired status code to the user guide application in execution, and
   wherein the user guide application comprises a database storing referential status codes, and the user guide application is configured to, when executed, cause the controller to serve as:
      a receiver configured to receive the acquired status code from the transmitter;
      a user guide application-side determining unit configured to determine whether the referential status codes stored on the database contain the received status code; and
      an information display unit configured to;
      when the user guide application-side determining unit determines that the referential status codes stored on the database contain the received status code, show on the display device guidance information that contains more detailed information than the display shown by the status display unit, based on the status code received by the receiver.

2. The information processing device according to claim 1, wherein the user guide application comprises:
   a program file configured to cause the controller to achieve operations presented by the user guide application; and
   a data file configured to store therein the guidance information.

3. The information processing device according to claim 1, wherein the executing unit is configured to launch the user guide application immediately after the device driver is launched.

4. The information processing device according to claim 1, wherein the executing unit is configured to execute the user guide application after the acquiring unit acquires the status code.

5. The information processing device according to claim 1, wherein the device driver is further configured to, when executed, cause the controller to serve as a download unit, wherein the download unit is configured to, when the determining unit determines that the user guide application is unexecutable, download a program adapted to operate as the user guide application from a server connected with the information processing device via a network, and wherein the executing unit is configured to execute the program downloaded by the download unit.

6. The information processing device according to claim 1, wherein the device driver is further configured to, when executed, cause the controller to serve as a selecting unit, wherein the selecting unit is configured to, when the determining unit determines that the user guide application is unexecutable, select a program that meets a predetermined requirement as an alternative program that operates as an alternative to the user guide application, from programs installed in the information processing device to control second devices other than the external device, and wherein the executing unit is configured to execute the alternative program selected by the selecting unit.

7. The information processing device according to claim 6, wherein the alternative program selected by the selecting unit has the common guidance information corresponding to the status code with the user guide application.

8. The information processing device according to claim 1, further comprising an information display unit configured to;

when the user guide application-side determining unit determines that the referential status codes stored on the database do not contain the received status code, show on the display device information that the user guide application should be updated.

9. A non-transitory computer readable medium storing device driver computer readable instructions and user guide computer readable instructions having a database storing referential status codes, wherein the device driver computer readable instructions, when executed by a computer, cause the computer to:

acquire from an external device a status code corresponding to a status of the external device;

display first information representing the status of the external device, based on the acquired status code;

determine whether the user guide computer readable instructions are executable;

execute the user guide computer readable instructions when determining that the user guide computer readable instructions are executable; and transfer the acquired status code to the user guide computer readable instructions in execution, in response to execution of the user guide computer readable instructions, and wherein the user guide computer readable instructions, when executed by the computer, cause the computer to:

receive the acquired status code from the user guide computer readable instructions;

determine whether referential status codes stored on the database contain the received status code; and an information display unit configured to:

display second information that contain more detailed guidance information than the first information based on the received status code, when determining that the referential status codes stored on the database contain the received status code.

\* \* \* \* \*